US011273507B2

(12) United States Patent
Predki (10) Patent No.: US 11,273,507 B2
(45) Date of Patent: Mar. 15, 2022

(54) METHOD FOR HARD MACHINING OF A PRECUT AND HEAT-TREATED GEARWHEEL WORKPIECE

(71) Applicant: Klingelnberg GmbH, Hückeswagen (DE)

(72) Inventor: Thomas Predki, Bad Bentheim (DE)

( * ) Notice: Subject to any disclaimer, the term of this patent is extended or adjusted under 35 U.S.C. 154(b) by 173 days.

(21) Appl. No.: 16/444,016

(22) Filed: Jun. 18, 2019

(65) Prior Publication Data
US 2019/0388987 A1    Dec. 26, 2019

(30) Foreign Application Priority Data
Jun. 20, 2018   (EP) ..................................... 18178813

(51) Int. Cl.
*G05B 19/18* (2006.01)
*B23F 23/12* (2006.01)
(Continued)

(52) U.S. Cl.
CPC .......... *B23F 23/1218* (2013.01); *B23F 19/05* (2013.01); *B23Q 15/12* (2013.01);
(Continued)

(58) Field of Classification Search
CPC .... B23F 23/1218; B23F 19/05; G05B 19/186; G05B 19/404; G05B 19/4065;
(Continued)

(56) References Cited

U.S. PATENT DOCUMENTS

2010/0221079 A1* 9/2010 Neumaier ............. G01M 13/02
409/2
2015/0338201 A1* 11/2015 Wuerfel ............. B23F 23/1218
700/160
(Continued)

FOREIGN PATENT DOCUMENTS

EP    2246658 A1    11/2010
EP    2314404 B1    6/2012
(Continued)

OTHER PUBLICATIONS

Dictionary.com (Year: NA) (Year: 2021).*
European Search Report for European Patent Application No. EP 18178813, dated Dec. 10, 2018, 3 pages.

*Primary Examiner* — Hien D Khuu
(74) *Attorney, Agent, or Firm* — McCarter & English, LLP (57) ABSTRACT

Method for hard machining of a precut and heat-treated gearwheel workpiece using a tool in a gear processing machine, having sensors and/or detectors, comprising:
  providing target data of the workpiece,
  determining a first relative movement of the tool relative to the workpiece based on the target data,
  executing the first relative movement, wherein an NC-controller brings the tool into contact with the workpiece in a controlled manner by the execution of the first relative movement,
  providing real-time measured values and movement data by means of the sensors and/or detectors during the execution of the first relative movement,
(Continued)

performing an analysis of the real-time measured values together with the movement data and determining adapted, workpiece-specific relative movements, hard machining at least one region of a tooth of the workpiece, wherein the NC-controller executes the adapted, workpiece-specific relative movements of the tool relative to the workpiece.

10 Claims, 5 Drawing Sheets

(51) Int. Cl.
| | |
|---|---|
| B23F 19/05 | (2006.01) |
| F16H 55/17 | (2006.01) |
| B23Q 15/12 | (2006.01) |
| B23Q 15/20 | (2006.01) |
| G05B 19/4065 | (2006.01) |
| G05B 19/404 | (2006.01) |
| F16H 55/08 | (2006.01) |

(52) U.S. Cl.
CPC ............. B23Q 15/20 (2013.01); F16H 55/17 (2013.01); G05B 19/18 (2013.01); G05B 19/186 (2013.01); G05B 19/404 (2013.01); G05B 19/4065 (2013.01); *F16H 55/08* (2013.01); *G05B 2219/45214* (2013.01)

(58) Field of Classification Search
CPC .......... G05B 19/18; G05B 2219/45214; G05B 19/401; B23Q 15/20; B23Q 15/12; F16H 55/17; F16H 55/08
USPC ........................................................ 700/159
See application file for complete search history.

(56) References Cited

U.S. PATENT DOCUMENTS

2018/0052440 A1* 2/2018 Weber ................. G05B 19/404
2018/0318946 A1* 11/2018 Gsell .................. B23F 23/1218

FOREIGN PATENT DOCUMENTS

| GB | 2203548 | * 10/1988 |
|---|---|---|
| JP | H0911085 A | 1/1997 |
| KR | 2015-0135139 | * 12/2015 |

* cited by examiner

METHOD FOR HARD MACHINING OF A PRECUT AND HEAT-TREATED GEARWHEEL WORKPIECE

CROSS-REFERENCE TO RELATED APPLICATIONS

This application claims priority under 35 U.S.C. §§ 119 (a)-(d) to European patent application no. EP 18 178 813.4 filed Jun. 20, 2018, which is hereby expressly incorporated by reference as part of the present disclosure.

FIELD OF THE INVENTION

The present disclosure generally relates to a method for the hard machining of a precut and heat-treated gearwheel workpiece.

BACKGROUND

There are various approaches for the hard machining of gearwheels. Hard machining refers to those methods which follow after the heat treatment of a gearwheel workpiece, wherein the heat treatment is carried out to provide the gearwheel workpiece with a hardened layer.

Figure 1:
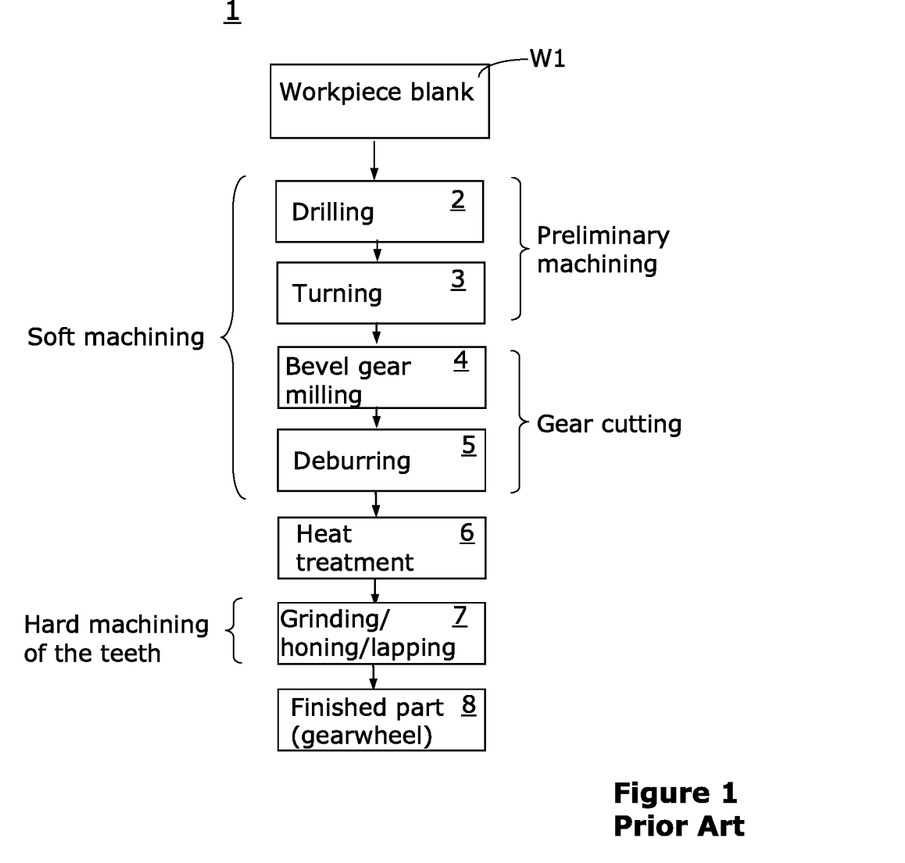
FIG. 1 schematically shows machining steps during the production of bevel gears according to the prior art.

FIG. 1 shows a schematic illustration of an exemplary method sequence 1 of the prior art. It is an example of the gear cutting machining of a bevel gear. Proceeding from a workpiece blank W1, the following soft machining steps are carried out in the example shown. For example, a (central) drilled hole can be produced by drilling (step 2). The workpiece blank W1 can then be machined using a lathe tool by turning (step 3). These steps are also referred to as preform production or as preliminary machining. Other steps or alternative steps can also be executed in the scope of the preform production. At the end of the preform production, the workpiece is referred to here as a gearwheel workpiece.

The so-called gear cutting now follows. The gearwheel workpiece can be machined, for example, by means of bevel gear milling cutters (step 4), to produce teeth and/or tooth gaps on the gearwheel workpiece. The deburring then follows as an optional step (step 5).

A heat treatment (step 6) typically subsequently follows to harden the gearwheel workpiece. Finish machining of the teeth (step 7) subsequently follows, for example. This finish machining is referred to here as tooth hard machining. Other steps of finish machining which are typically carried out are not mentioned separately here. The bevel gear is then finished in step 8.

It can occur due to the heat treatment in step 6 that the gearwheel workpiece displays a so-called hardening distortion. Such a hardening distortion is a volume change of the gearwheel workpiece.

In the gear cutting machining of large and very costly gearwheels especially, the hard machining of the teeth is therefore carried out with the greatest caution, to avoid the tool colliding with a tooth flank or a head face of one of the teeth of the gearwheel workpiece, for example, with excessive infeed movement, or overheating due to grinding occurring on the gearwheel workpiece because an excessively large removal performance is demanded of the tool. Alternatively, such a gearwheel workpiece can be subjected to a precise three-dimensional measurement after the hardening (for example, in a coordinate measuring center) to determine the specific hardening distortion before the hard machining (step 7) is planned and executed.

Measures also have to be taken in the mass production of gearwheels to take into consideration possible hardening distortions during the hard machining (step 7), so that, for example, the tool is not plunged in excessively far during the infeed and thus removes or partially penetrates the hardened layer on the gearwheel workpiece.

SUMMARY

It is therefore an objective to provide a method which is capable of avoiding the problems which can result from the hardening distortion of a gearwheel workpiece, or is capable of reducing the influence of the hardening distortion on the efficiency of the hard machining.

According to at least some embodiments, a method is provided for the hard machining of the teeth of a precut and heat-treated gearwheel workpiece. In at least some such embodiments, a tool is used in a gear processing machine, which comprises multiple NC-controlled axes, the movements of which are controllable via an NC-controller, and wherein the gear processing machine has sensors and/or detectors. The method comprises the following steps, which do not necessarily have to be executed in the sequence given:

providing target data of the gearwheel workpiece, determining a first relative movement of the tool in relation to the gearwheel workpiece on the basis of the target data, executing the first relative movement, wherein the NC-controller brings the tool into contact in a controlled manner with the gearwheel workpiece—for example, with a tooth of the gearwheel workpiece—by the execution of the first relative movement, providing real-time measured values and movement data by means of the sensors and/or detectors during the execution of the first relative movement, performing an analysis of the real-time measured values together with the movement data and determining adapted, workpiece-specific relative movements, hard machining at least one region of a tooth of the gearwheel workpiece, wherein the NC-controller executes the adapted, workpiece-specific relative movements of the tool in relation to the gearwheel workpiece.

According to at least some embodiments, the three-dimensional measurement of the gearwheel workpiece is replaced by a method in which so-called machine traces (referred to here as real-time measured values and movement data) are provided and analyzed. The machining sequence for the hard machining of at least one tooth of the gearwheel workpiece is then adapted on the basis of these machine traces; i.e., adapted, workpiece-specific relative movements are determined which take the fact into consideration that the gearwheel workpiece has been distorted, for example, during the heat treatment.

The term "adapted, workpiece-specific relative movements" is used here to indicate that the relative movements which are executed during the hard machining of at least one tooth were adapted because of the changed shape of the gearwheel workpiece. If one were to determine the target relative movements for the hard machining on the basis of the target data of the gearwheel workpiece, these target relative movements would thus differ from the adapted, workpiece-specific relative movements.

In at least some embodiments, a (target) movement sequence is predetermined (for example, computed) in an intermediate step on the basis of the target data. In this case, this is a theoretical movement sequence which would be executed during the hard machining of at least one tooth of the gearwheel workpiece if it were to correspond 1:1 to the target workpiece after the heat treatment.

In at least some such embodiments, results of the analysis can optionally be used in a further step to determine an adapted, workpiece-specific movement sequence, wherein this adapted, workpiece-specific movement sequence defines the relative movements which are executed during the hard machining of at least one tooth of the gearwheel workpiece. This adapted, workpiece-specific movement sequence differs from the (target) movement sequence.

The determination of the adapted, workpiece-specific movement sequence can be carried out in at least some embodiments in that a computer-assisted adaptation of the predetermined movement sequence is performed on the basis of the results of the analysis.

In at least some embodiments, the analysis of the real-time measured values together with movement data is configured for determining the actual geometry of the gearwheel workpiece after a heat treatment and before the hard machining.

In at least some such embodiments, the analysis can be carried out to determine a deviation of the actual geometry of the gearwheel workpiece after the heat treatment in relation to a target geometry of the gearwheel workpiece.

In at least some embodiments, the provision of the real-time measured values is performed by means of the sensors and/or detectors in the gear processing machine to determine contact points and/or regions which occur between the tool and the gearwheel workpiece upon the execution of the first relative movement (for example, to establish them in three-dimensional space). These contact points and/or regions can be, for example, on the teeth of the gearwheel workpiece in at least some embodiments, however, they can also be determined at other points or regions of the gearwheel workpiece.

In at least some such embodiments, an imbalance or a thermal distortion of the gearwheel workpiece can be determined in a substep of the method on the basis of the contact points and/or regions and can be defined in three-dimensional space. This can take place, for example, to indicate the imbalance or the thermal distortion, to document it, or to compute the adapted, workpiece-specific relative movements on the basis of the imbalance or the thermal distortion.

In at least some embodiments, the adapted, workpiece-specific relative movements are predetermined to avoid damage to the tool (for example, due to collision) and/or to avoid overheating due to grinding on the gearwheel workpiece (for example, because the tool penetrates with an excessive infeed into the material of the gearwheel workpiece) and/or to avoid the tool penetrating a hardened layer of the gearwheel workpiece in the scope of the hard machining of the gearwheel workpiece.

In at least some embodiments, the adapted, workpiece-specific relative movements comprise at least one changed travel distance (and/or a changed movement path) of the tool in relation to the gearwheel workpiece.

In at least some embodiments, the first relative movement is executed so that at least one tooth flank of a tooth of the gearwheel workpiece is contacted by the tool, wherein during the execution of the first relative movement, the real-time measured values and movement data are provided by means of the sensors and/or detectors. Due to the provision of these real-time measured values and movement data, this contact can be quasi-defined/established in the three-dimensional space.

However, the method can be used not only to avoid damage but rather it can also be used to optimize the relative movements in a workpiece-specific manner. In this context, for example, it is possible to avoid the tool from rotating an unnecessarily long time in the air before a first productive contact with the gearwheel workpiece occurs. Unproductive movement sequences can also be entirely avoided.

This summary is not exhaustive of the scope of the aspects and embodiments of the invention. Thus, while certain aspects and embodiments have been presented and/or outlined in this summary, it should be understood that the inventive aspects and embodiments are not limited to the aspects and embodiments in this summary. Indeed, other aspects and embodiments, which may be similar to and/or different from, the aspects and embodiments presented in this summary, will be apparent from the description, illustrations and/or claims, which follow, but in any case are not exhaustive or limiting.

It should also be understood that any aspects and embodiments that are described in this summary and elsewhere in this application and do not appear in the claims that follow are preserved for later presentation in this application or in one or more continuation patent applications.

BRIEF DESCRIPTION OF THE DRAWINGS

Exemplary embodiments, which are understood not to be limiting, are described in greater detail hereafter with reference to the drawings.

DETAILED DESCRIPTION

Figure 2A:
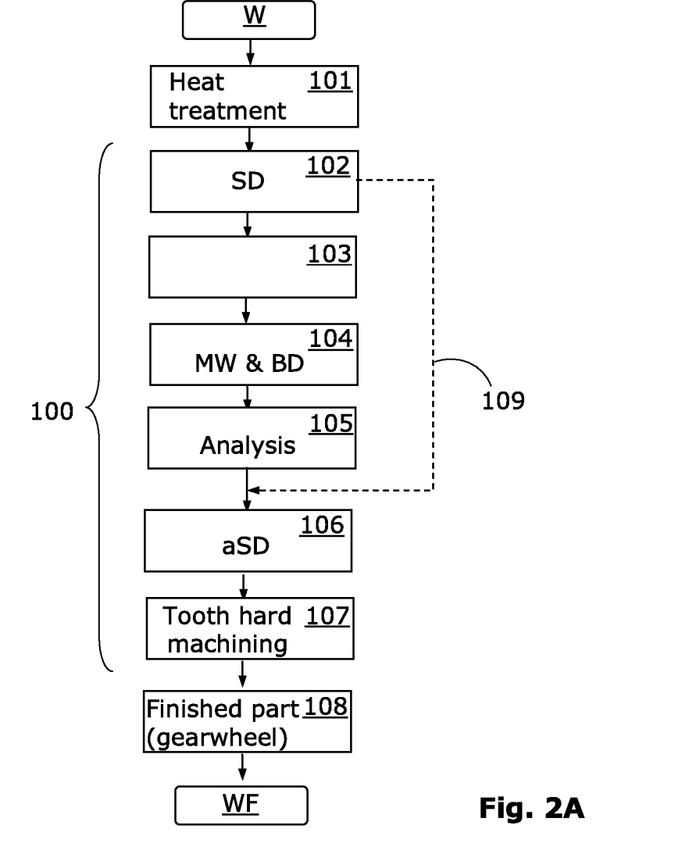
FIG. 2A schematically shows various machining steps of a first method.
Figure 2B:
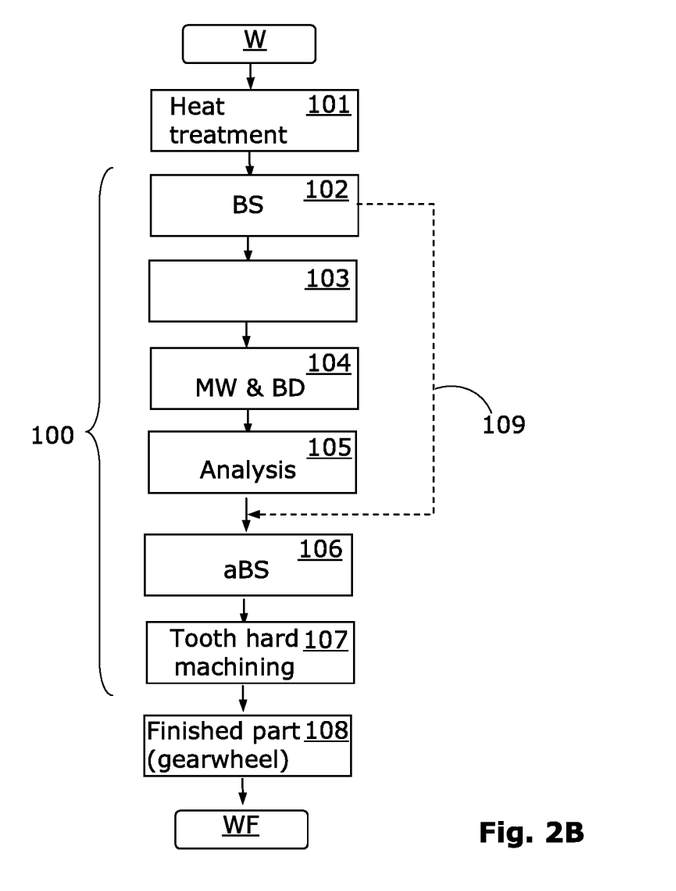
FIG. 2B schematically shows various machining steps of a second method.

FIGS. 2A and 2B each schematically show a method 100, which was developed for the hard machining of gear teeth on a gearwheel workpiece W in a gear processing machine.

In at least some embodiments, the method 100 comprises the substeps shown in FIG. 2A. The substeps shown do not necessarily have to be executed in the sequence indicated.

The method 100 is suitable for hard machining 107 of the teeth of a precut and heat-treated gearwheel workpiece W. The method 100 can begin, for example, with step 102.

In the scope of the method 100, a tool 10 is used in a gear processing machine 20. Depending on the desired hard machining 107, the tool 10 can be, but is not limited to, a grinding tool, a honing tool, or a lapping tool. The hard machining 107 can also, however, comprise a combination of steps—for example, rough machining using a first tool and finish machining using a second tool.

The gear processing machine 20 is a machine which comprises multiple NC-controlled axes, the movements of which are controllable via an NC-controller S and are detectable by means of sensors 23 and/or detectors 24.

In at least some embodiments, one or more of the following sensors 23, 24 are used:
vibration pickups and seismic sensors,
acoustic sensors (for example, ultrasound sensors),
magnetic sensors,
current and/or voltage sensors,
pressure sensors,
sensors operating in a contactless manner (e.g., Hall sensors, optical sensors, inductive sensors, or capacitive sensors),
resistive sensors,
tactile sensors.

In at least some embodiments, one or more of the following detectors 23, 24 are used:
distance detectors operating in a linear or nonlinear manner,
distance measuring systems,
runtime detectors,
angle detectors,
rotational detectors,
rotary detectors (for example, angle decoders),
detectors for measuring the present power consumption of a drive of the machine 20,
voltage detectors,
(CCD-) camera-based detectors.

In at least some embodiments, the sensors and/or detectors 23, 24 supply items of information about the movements of at least one of the NC-controlled axes and items of information which are related to contacts of the tool 10 with the gearwheel workpiece W. These items of information are referred to here as real-time measured values MW and movement data BD. In summary, these items of information are also referred to as machine traces.

The method 100 is designed for the situationally adapted hard machining 107 of at least one tooth of a precut and heat-treated gearwheel workpiece W using a tool 10. This situationally adapted hard machining 107 takes place in a gear processing machine 20, which comprises multiple NC-controlled axes, the movements of which are controllable via an NC controller S. Moreover, the gear processing machine 20 comprises sensors and/or detectors 23, 24, as already noted.

In at least some embodiments, the method 100 comprises the following steps. Reference is made here to FIG. 2A.

In a step 102, for example, target data SD are provided for the hard machining of the gearwheel workpiece W. These target data SD can be loaded, for example, from a memory of the machine 20, or they can be computed, for example, in the scope of a design of the gearwheel workpiece W.

Before the standard hard machining takes place, firstly at least one (preparatory) relative movement 103 is executed. In the scope of this relative movement 103, the NC controller S moves the tool 10 in relation to the gearwheel workpiece W to bring the tool 10 into contact in a controlled manner with the gearwheel workpiece W (for example, with a tooth flank, a head face, an end face, or a lateral face of the gearwheel workpiece W). The first relative movement 103 may be calculated or predetermined in at least some embodiments on the basis of the target data SD.

During step 103, real-time measured values MW and movement data BD are acquired by means of the sensors and/or detectors 23, 24. This step is identified as step 104 in FIG. 2A. The real-time measured values MW and the movement data BD are also referred to here as real-time process data or as machine traces.

Step 104 is followed by a step 105, which is used to perform an analysis of the real-time measured values MW together with the movement data BD. This step 105 can supply, for example, the information that one of the teeth of the gearwheel workpiece W has an excessive tooth height.

The analysis of the real-time measured values MW is performed in step 105 to obtain actual information on the gearwheel workpiece W on the basis of the real-time process data without having to separately subject this gearwheel workpiece W to a measurement. I.e., the actual geometry of the gearwheel workpiece W is determined in the machine 20 (using the means of the machine 20) in a quasi-indirect manner here.

In a step 106, adaptations are performed, which are required if the actual information indicates that the gearwheel workpiece W does not correspond to the target data SD (for example, since a hardening distortion has occurred during the heat treatment 101).

In at least some embodiments, these adaptations are performed by converting/transforming the original target data SD into adapted target data aSD. An adapted movement sequence aBS for the individual steps of the hard machining results on the basis of the adapted target data aSD (step 107). I.e., the analysis in step 105 enables the controller S to execute adapted relative movements of the tool 10 in relation to the gearwheel workpiece W.

FIG. 2A shows an optional path 109 to symbolize that in step 106, the original target data SD can be changed. Instead of changing the original target data SD, adapted, workpiece-specific target data aSD can be newly computed in step 106.

The hard machining of at least one tooth of the gearwheel workpiece W is now performed by an execution of workpiece-specific adapted relative movements (these workpiece-specific adapted relative movements are defined, for example, by an adapted movement sequence aBS) in the gear processing machine 20. This step is identified by the reference sign 107 in FIG. 2A. The finished part WF is then provided in a step 108.

In step 107, the NC controller S specifies adapted, workpiece-specific relative movements of the tool 10 in relation to the gearwheel workpiece W, wherein these adapted, workpiece-specific relative movements are determined using results of the analysis in step 105.

Figure 3A:
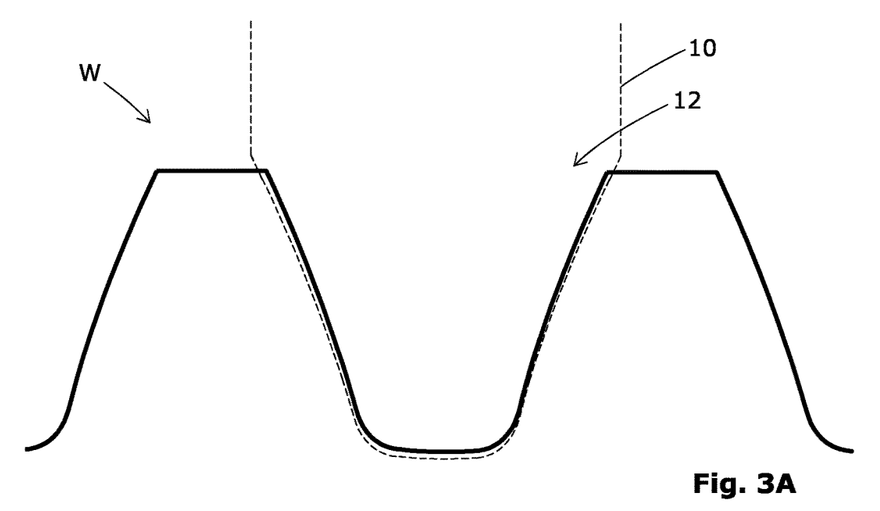
FIG. 3A schematically shows a tooth gap of a spur gear shown by way of example, the tooth flanks of which are hard machined using a profile grinding wheel in a conventional manner.
Figure 3B:
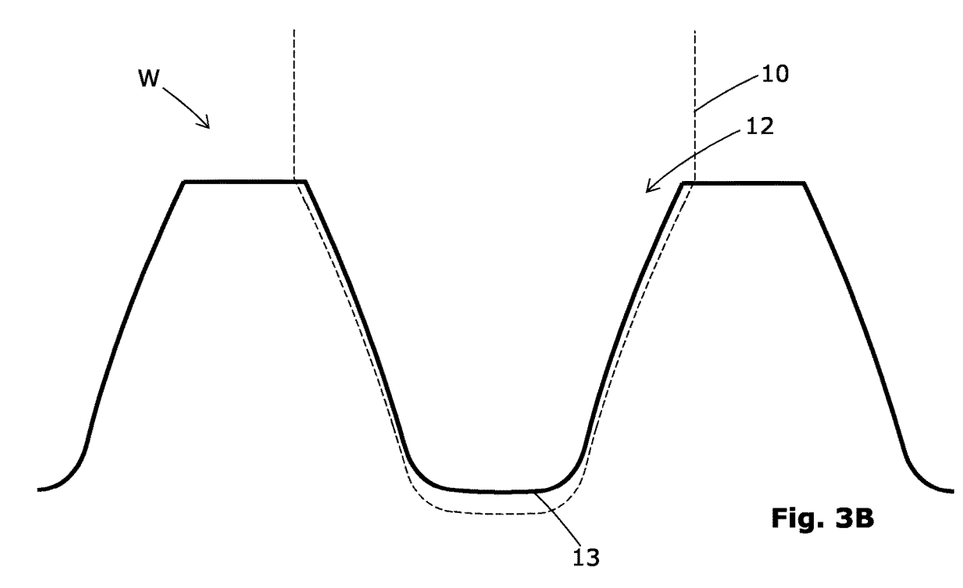
FIG. 3B schematically shows a tooth gap of a spur gear shown by way of example, which displays significant hardness distortion because of a heat treatment, wherein the tooth flanks are also to be hard machined using a profile grinding wheel in a conventional manner here.

An advantage of the method 100 will be explained hereafter on the basis of a greatly simplified example. Reference is made in this context to the schematic illustrations of FIGS. 3A and 3B. In each of the two figures, the schematic view of a tooth gap 12 of a gearwheel workpiece W (a spur gear here) is shown. In addition to the gearwheel workpiece W, a portion of a tool 10 (a profile grinding wheel here) is shown. FIG. 3A shows a situation in which the workpiece W has normal dimensions in the region of the tooth gap 12 to be ground. FIG. 3B, in contrast, shows a situation in which the workpiece W has a significant hardening distortion in the region of the tooth gap 12 to be ground. The hardening distortion is displayed above all in the region of the tooth base 13 of the tooth gap 12 in this very schematic example. Significantly increased dimensions have resulted in the region of the tooth base 13 due to the hardening distortion. If this tooth gap 12 were now machined using the tool 10 in a conventional manner, a strong deflection would result for the tool 10 and overheating due to grinding can occur in the region of the tooth gap 12 at the tooth base 13.

According to at least some embodiments, the tool 10 can now be fed slowly into the tooth gap 12, while the tool 10 is rotationally driven around the axis of rotation R2. In this exemplary embodiment, for example, a detector 23 (see, for example, FIG. 4), which observes/records the power consumption of the drive, is associated with the drive of the tool spindle 21. As long as the tool 10 moves freely in the air without contact with the tooth flanks and the tooth base 13, the power consumption of the drive is relatively low. If the tooth flanks and/or the tooth base 13 of the tooth gap 12 now come into contact with the tool 10, the power consumption increases suddenly. In this case, the detector supplies information, which relates to a contact of the tool 10 with the gearwheel workpiece W. This information is referred to here in general as a real-time measured value MW. In addition, at least at this point in time, information is also acquired which includes the present infeed position (plunging depth) of the tool 10. Such items of information are referred to here in general as movement data BD.

A software module SM, which can be part of the controller S, for example, is now capable of defining the specific dimensions of the relevant tooth gap 12 in three-dimensional space on the basis of the real-time measured value MW and the movement data BD. This procedure is referred to here as analysis (step 105), wherein this is a computer-assisted analysis or a computer analysis, respectively.

Since now the software module SM and/or the controller S knows the actual geometry of the gearwheel workpiece W (to be precise, in this specific example only the dimensions of the tooth gap 12 of the gearwheel workpiece W are known), the movement sequence BS, which defines the standard sequence for the hard machining of the gearwheel workpiece W, can be adapted. An adapted workpiece-specific movement sequence aBS is obtained in this manner.

The adapted, workpiece-specific movement sequence aBS can, for example, in the example of FIG. 3B, comprise several substeps, which are used to grind the relevant tooth gap 12 using a reduced infeed speed, in order to avoid overheating due to grinding.

The method 100 can also comprise the following steps in at least some embodiments. Reference is made here to FIG. 2B.

In a step 102, a predetermined movement sequence BS is provided for the hard machining of the gearwheel workpiece W. This movement sequence BS can be loaded, for example, from a memory of the machine 20, or it can be computed on the basis of target data SD of the gearwheel workpiece W, on the basis of the data of the tool 10 and the data of the machine 20.

Before the standard hard machining is carried out, firstly at least one (preparatory) relative movement 103 is executed (this relative movement 103 can also comprise a movement sequence). In the scope of this/these relative movement(s) 103, the NC-controller S moves the workpiece 10 in relation to the gearwheel workpiece W to bring the tool 10 into contact with the gearwheel workpiece W in a controlled manner. In this case, excessively strong contacts or collisions may be avoided by the relative movements 103 resulting in a cautious iterative approach of the tool 10.

During step 103, real-time measured values MW and movement data BD are acquired by means of the sensors and/or detectors 23, 24. This step is identified in FIG. 2 as step 104. The real-time measured values MW and the movement data BD are also referred to here as real-time process data.

Step 104 is followed by a step 105, which is used to perform an analysis of the real-time measured values MW together with the movement data BD. To return to the simple example of FIG. 3A, this step 105 supplies the information that one of the tooth gaps 12 has excessively large dimensions and from which infeed depth a first contact occurred between the tool 10 and the tooth flanks.

In a step 106, an adapted workpiece-specific movement sequence aBS is now determined. This may take place by way of an adaptation of the predetermined movement sequence BS on the basis of the results of the analysis in step 105 in at least some embodiments. An optional path 109 is shown in FIG. 2B to symbolize that in step 106, the original movement sequence BS can be changed. Instead of changing the original movement sequence BS, a new workpiece-specific movement sequence aBS can also be computed in step 106.

The hard machining of the gearwheel workpiece W is now performed by an execution of the workpiece-specific movement sequence aBS in the gear processing machine 20. This step is identified by reference sign 107 in FIG. 2B. The finished part WF is then provided in a step 108.

It is frequently the case that a (target) movement sequence BS of the NC-controlled axes of the machine 20 is predetermined on the basis of the target data SD of the gearwheel workpiece W. This movement sequence BS can be determined, for example, by taking into consideration details of the machine 20 and details of the tool 10. The movement sequence BS, which can comprise an array of relative movements, does not have to be provided as the list of individual relative movements, however, but rather the movement sequence BS can be defined, for example, by machine data of the machine 20. The NC-controller S loads these machine data and then determines the corresponding relative movements on the fly and controls the drives of the relevant NC-controlled axes so that they execute the relative movements.

The adaptation of the relative movements can have the result, for example, that at least one (displacement) movement path (for example, the infeed movement) of the tool 10 in relation to the gearwheel workpiece W is changed, or in the case of an iterative machining method, the number of the steps is increased or reduced, the step width is increased or reduced, or a speed profile is adapted, to give only a few examples. The adaptation of the relative movements can also comprise, for example, a changed movement and/or speed profile of at least one relative movement, for example.

In general, in step 104 the provision of the real-time measured values MW can be performed by means of the sensors and/or detectors 23, 24 in the gear processing machine 20 so that contact points and/or contact regions which occur upon execution of the first relative movement 103 between the tool 10 and the gearwheel workpiece W can be determined. These contact points and/or contact regions can be defined, for example, in the three-dimensional reference system of the machine 20. If one compares the contact points and/or contact regions to target data SD of the gearwheel workpiece W, deviations of the actual geometry in relation to the target geometry (defined by the target data SD) can thus be computed on the basis of this comparison. These deviations can be used according to the method 100 in order to predetermine adapted relative movements for the hard machining in step 107.

In at least a part of the embodiments, a concentricity error or a thermal distortion of the gearwheel workpiece W can be determined on the basis of the contact points and/or regions and can be defined in the three-dimensional space.

The contact points and/or regions can be determined during the execution of the first relative movement 103, for example, at least on one tooth flank of a tooth of the gearwheel workpiece W with the tool 10, wherein during the execution of the first relative movement 103, the real-time measured values MW and movement data BD are provided by means of the sensors and/or detectors 23, 24.

During the execution of the first relative movement 103, for example, at least one end face of the gearwheel workpiece W can be subjected to turning using a torsion bar used as the tool 10. A hardening distortion of the end face, for example, can be remedied or corrected by this turning. During the turning, the real-time measured values MW and movement data BD are then provided by means of the sensors and/or detectors 23, 24, to determine the actual geometry of the gearwheel workpiece W in this manner and adapt the machining sequences of the hard machining 107 on the basis of the knowledge of the actual geometry.

There are various reasons why the method 100 can be applied. Several simple examples are mentioned hereafter. Because adapted, workpiece-specific relative movements are predetermined, for example, damage to the tool 10 can be avoided. However, for example, overheating due to grinding on the gearwheel workpiece W can also be avoided, which can occur if the tool 10 is moved against the gearwheel workpiece W excessively fast or with excessive infeed. However, it is also possible to avoid, for example, in the scope of the hard machining 107 of the gearwheel workpiece W, the tool 10 partially penetrating and thus damaging a hardened layer which results during the heat treatment 101 with a certain thickness on the gearwheel workpiece W.

Figure 4:
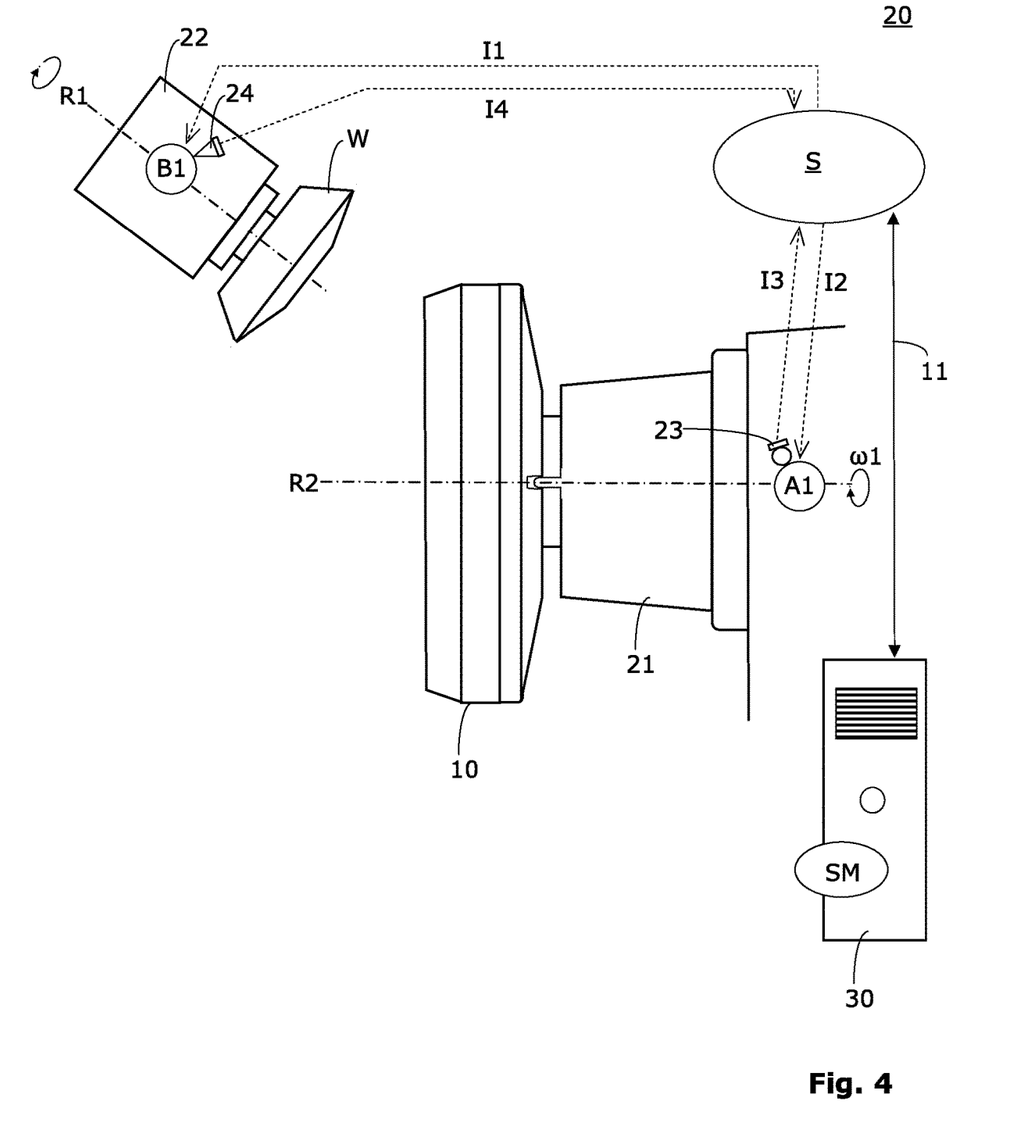
FIG. 4 schematically shows a part of a grinding machine having a cup grinding wheel for the hard machining of a bevel gear, wherein the method is executable in this machine.

A gear processing machine 20 comprises, for example, as schematically shown in FIG. 4, a workpiece spindle 22, which is designed to accommodate a gearwheel workpiece W (in the form of a crown wheel shown in stylized form here). Moreover, the machine 20 comprises a tool spindle 21 for accommodating a grinding tool 10 (in the form of a cup grinding wheel here) and also multiple drives (for example, A1, B1, and further drives, which are not shown in FIG. 4) for the hard machining of the gearwheel workpiece W.

The grinding tool 10 executes a rotation ω1 around the axis of rotation R2 of the tool spindle 21 during the hard machining of the gearwheel workpiece W. The corresponding axial drive is identified by A1. The grinding tool 10 engages in the gearwheel workpiece W to remove material. Furthermore, an NC-controller S is shown, which is designed to control the movement sequences in the machine 20, as indicated by the control signals I1, I2.

Furthermore, an optional computer 30 is shown, which is designed (programmed) to execute parts of the method steps of the method 100. The computer 30 can comprise, for example, a corresponding software module SM. The computer 30 has a communication connection to the machine 20 and/or the controller S, as indicated in FIG. 4 by the connection 11. The computer 30 does not necessarily have to be embodied as a complete computer in at least some embodiments. In at least some embodiments, a computer module, a chip module, or a plug-in card having processor or the like can also be used. The computer 30 can also be part of the controller S, or the controller S can be part of the computer 30, in at least some embodiments. The software module SM can also be programmed/installed in at least some embodiments so that it is executable by the controller S.

To be able to execute at least some embodiments in the machine 20 of FIG. 4, this machine 20 comprises at least one sensor or detector 23, which is associated in the example shown with the tool spindle 21, and a sensor or detector 24, which is associated in the example shown with the workpiece spindle 22. The sensor or detector 23 is connected, for example, by means of a data or information line 13 to the controller S and/or to the optional computer 30. The detector or sensor 24 is connected, for example, by means of a data or information line 14 to the controller S and/or to the optional computer 30.

For example, a rotary detector (for example, angle decoder) can be used as the detector 24. It supplies the controller S and/or the computer 30 with movement data BD in the form of angle information. An detector, which is designed to measure the present power consumption of the drive A1 of the machine 20, can be used, for example, as the detector 23.

The exemplary embodiment illustrated in FIG. 4 is to be understood solely as a possible embodiment.

While the above describes certain embodiments, those skilled in the art should understand that the foregoing description is not intended to limit the spirit or scope of the present disclosure. It should also be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A method comprising: hard machining a precut and heat-treated gearwheel workpiece using a tool in a gear processing machine, the gear processing machine comprising multiple Numerical Control-controlled axes and one or more of sensors or detectors, and a Numerical Control-controller configured to control movements of the multiple Numerical Control-controlled axes, the method further comprising the following steps:—determining a first relative movement of the tool relative to the gearwheel workpiece using target data of the gearwheel workpiece;—executing the first relative movement including contacting the tool with the gearwheel workpiece in a controlled manner using the Numerical Control-controller;—obtaining, using the one or more sensors or detectors, real-time measured values relating to the contacting of the tool and the workpiece and movement data related to one or more of movements or positions of components of the gear processing machine during the executing step; and—analyzing the real-time measured values and the movement data and determining, based on said analyzing, at least one second relative movement of the tool and the gearwheel workpiece adapted for the gearwheel workpiece; wherein said hard machining includes hard machining at least one portion of a first tooth of the gearwheel workpiece, including the Numerical Control-controller executing the at least one second relative movement of the tool relative to the gearwheel workpiece, the method further including—determining, prior to said hard machining, a movement sequence of the multiple Numerical Control-controlled axes using the target data, and—determining, using results of the analyzing step, a second movement sequence adapted for the gearwheel workpiece and defining relative movements of the multiple Numerical Control-controlled axes that define the at least one second relative movement, wherein said hard machining includes executing the second movement sequence, wherein, the method further includes, prior to the step of determining the second movement sequence, determining adapted target data using actual geometry of the gearwheel workpiece; and wherein the step of determining the second movement sequence comprises modifying the movement sequence using said results of the analyzing step and said adapted target data.

2. The method according to claim 1, wherein the analyzing step comprises determining the actual geometry of the heat-treated gearwheel workpiece before said hard machining.

3. The method according to claim 1, wherein the analyzing step comprises determining a deviation of the actual geometry of the heat-treated gearwheel workpiece relative to a target geometry.

4. The method according to claim 1, wherein the step of obtaining real-time measured values comprises determining one or more of contact points or contact regions between the tool and the gearwheel workpiece during the step of executing the first relative movement.

5. The method according to claim 4, further comprising determining a concentricity error or a thermal distortion of the gearwheel workpiece in three-dimensional space using said one or more of contact points or contact regions.

6. The method according to claim 1, wherein the step of determining at least one second relative movement includes defining the at least one second relative movement so as to avoid, during said hard machining, one or more of damage to the tool, overheating due to grinding on the gearwheel workpiece, or the tool penetrating a hardened layer of the gearwheel workpiece.

7. The method according to claim 1, wherein the at least one second relative movement comprises at least one changed travel distance of the tool relative to the gearwheel workpiece as compared to a travel distance of the tool relative to the gearwheel workpiece of the first relative movement.

8. The method according to claim 1, wherein said contacting step includes contacting at least one tooth flank of the first tooth or another tooth of the gearwheel workpiece with the tool, and the obtaining step is performed during the step of executing the first relative movement.

9. The method according to claim 1, wherein the tool defines a torsion bar, the method further includes, during the step of executing the first relative movement, turning at least one end face of the gearwheel workpiece using the tool and correcting distortion of the at least one end face, and the obtaining step is performed during the turning step.

10. A method comprising: hard machining a precut and heat-treated gearwheel workpiece using a tool in a gear processing machine, the gear processing machine comprising multiple Numerical Control-controlled axes and one or more of sensors or detectors, and a Numerical Control-controller configured to control movements of the multiple Numerical Control-controlled axes, the method further comprising the following steps:—determining a first relative movement of the tool relative to the gearwheel workpiece using target data of the gearwheel workpiece;—executing the first relative movement including contacting the tool with the gearwheel workpiece in a controlled manner using the Numerical Control-controller;—obtaining, using the one or more of sensors or detectors, real-time measured values relating to the contacting of the tool and the workpiece and movement data related to one or more of movements or positions of components of the gear processing machine during the executing step; and—analyzing the real-time measured values and the movement data and determining, based on said analyzing, at least one second relative movement of the tool and the gearwheel workpiece adapted for the gearwheel workpiece; wherein said hard machining includes hard machining at least one portion of a tooth of the gearwheel workpiece, including the Numerical Control-controller executing the at least one second relative movement of the tool relative to the gearwheel workpiece; and wherein the tool defines a torsion bar, the method further includes, during the step of executing the first relative movement, turning at least one end face of the gearwheel workpiece using the tool and correcting distortion of the at least one end face, and the obtaining step is performed during the turning step.

* * * * *